United States Patent Office 2,705,876
Patented Apr. 12, 1955

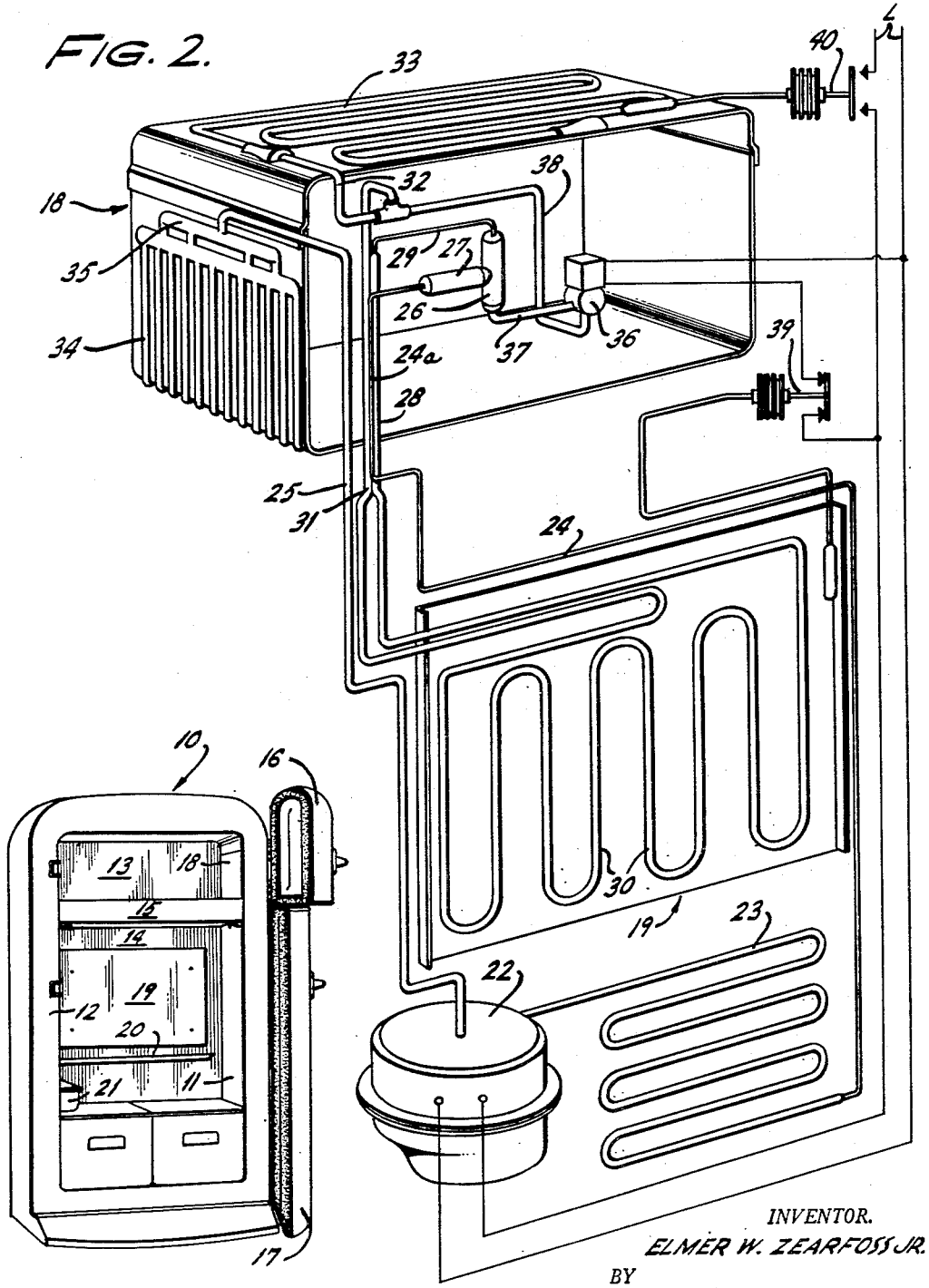

2,705,876

TWO-TEMPERATURE REFRIGERATOR

Elmer W. Zearfoss, Jr., Philadelphia, Pa., assignor to Philco Corporation, Philadelphia, Pa., a corporation of Pennsylvania Application August 14, 1952, Serial No. 304,272

5 Claims. (Cl. 62—117.3)

The invention hereinafter disclosed and claimed relates to refrigeration apparatus, being particularly concerned with household refrigerators of the kind which include freezing and food storage compartments each provided with evaporator means adapted to maintain the associated compartment within a predetermined temperature range.

The apparatus of the present invention is of the same general type as, but incorporates certain improvements over, the apparatus claimed in the co-pending application of Malcolm G. Shoemaker, Serial No. 296,995, filed July 3, 1952, and assigned to the assignee of the present invention.

As set forth in said co-pending disclosure it is the primary advantage of refrigeration equipment of the general kind to which the invention has reference, that it provides a truly automatic refrigerator of the multi-compartment type, in which the freezing compartment is held at a uniform zero-zone temperature and the food storage compartment is capable of maintaining desired stabilized "water load" temperatures, for example in the region of 38° F. to 40° F., regardless of changes in ambient temperature and almost independent of the refrigeration demands which usage places upon the equipment. Importantly refrigerators of this kind are characterized by virtually complete elimination of condensation which has commonly occurred within the food storage compartments of plural compartment refrigerators of the prior art.

In the achievement of the foregoing and other general objectives which the present invention has in common with the type of apparatus claimed in the mentioned Shoemaker disclosure, there is utilized, in addition to a freezing evaporator, a relatively large evaporator preferably of plate-like form disposed within the food storage compartment. These evaporators are utilized in combination with novel refrigerant circuitry, flow through which is controlled primarily from the freezing compartment and which circuitry includes auxiliary control means responsive to temperatures at said plate-like evaporator to establish and terminate cyclically, the flow of refrigerant to the latter evaporator, and thereby to cause it to cycle between a predetermined minimum temperature value well below the freezing point of water and a predetermined maximum temperature value slightly above freezing. The plate-like evaporator can constitute the sole means providing refrigeration within the food storage compartment, and the control apparatus utilized results in automatic maintenance of unusually stable conditions within both compartments, and with virtual elimination of condensation of moisture within the food storage compartment. In this improved refrigerator the pair of evaporator portions which cool the two compartments and one of which limits the humidity of the food storage compartment, are utilized in combination with extremely simple and inexpensive means making it possible to continue refrigeration within the freezing compartment while yet positively preventing flow of liquid refrigerant to the food storage evaporator in order to accomplish defrosting of the latter.

The instant invention has particular reference to the defrosting cycle of the evaporator of the food storage compartment, it being the principal objective of this invention to make it possible for that evaporator to rise to its predetermined maximum temperature value, in excess of freezing, rapidly and uniformly.

As will be clearly understood as the description proceeds, the evaporator of the food storage compartment is provided with refrigerant inflow and outflow passages connected, respectively, with the main restrictor and with the evaporator of the freezing compartment, and the general objective outlined above is achieved, in accordance with this invention, by applying heat to said inflow and outflow passages during periods when supply of liquid refrigerant to the evaporator of the food storage compartment is terminated and defrosting thereof takes place.

With more particularity, and in a preferred embodiment of the invention, heat is applied to the said inflow and outflow passages by placing both of said passages in heat exchange relation with the main capillary tube which comprises the restrictor of the system. Such disposition of the aforesaid passages provides for transfer of sufficient heat from the relatively warm liquid in the main capillary tube to the colder refrigerant in the inflow passage, or inlet tube, to ensure that the said inlet tube is elevated to a temperature above 32° F. as rapidly as possible, it being understood that relatively small quantities, of gaseous refrigerant only, are present within the latter tube under the defrosting condition. In addition, since the heat exchange relationship includes the plate outlet passage or tube, the heat of liquid available in the refrigerant flowing in the main restrictor warms the said outlet tube or passage and prevents cooling of the food compartment evaporator which would otherwise occur as a result of the fact that the latter passage constitutes a thermally conductive path interconnecting the evaporators of the food storage and freezing compartments.

The manner in which the foregoing and other objects and features of my invention may best be realized will be fully understood from a consideration of the following detailed description taken together with the accompanying drawing, in which there is illustrated a preferred embodiment of the invention.

In the drawing:

Figure 1 is a face, perspective view of a multi-compartment refrigerator incorporating apparatus of the present invention; and, Figure 2 is an enlarged perspective view (diagrammatic in certain respects) illustrating the refrigerant circulating system and thermally responsive control apparatus utilized in refrigerators of the type claimed in the aforesaid co-pending disclosure, and showing, applied to such a system, my preferred apparatus for heating the inlet and outlet tubes of the food compartment evaporator.

Now making more detailed reference to the drawing, and with initial emphasis upon the constructional features which the apparatus of my invention has in common with the equipment described and claimed in the mentioned co-pending disclosure, it will be seen that the invention is illustrated as embodied in a domestic or household refrigerator comprising an outer cabinet shell 10 and an inner shell or liner member 11, spaced and insulated from the outer shell 10 by means of any suitable insulation, not shown. As is customary, breaker strip means 12 of low thermal conductivity extends about the forward face of the cabinet and bridges the gap between the outer shell 10 and the inner liner 11. It will be understood that the cabinet includes a compartment housing a condenser-compressor unit of any desired type. The condensing apparatus is shown somewhat diagrammatically in Figure 2, but illustration of those portions of the cabinet which house the same is not necessary herein, since the present invention is not concerned therewith.

As clearly appears in Figure 1 the space within the inner liner 11 is sub-divided into an upper freezing compartment 13 and a lower food storage compartment 14 by means of a thermally non-conductive partition or vapor barrier 15 which thermally isolates the freezing compartment from the food storage compartment and prevents migration of moisture from the latter compartment to the freezer. Upper and lower insulated doors 16 and 17, of known type, provide access to the two compartments, these doors being adapted to seal the cabinet by seating against the aforesaid breaker strip means 12.

The two compartments 13 and 14 are each provided with suitable cooling means (see particularly Figure 2), the cooling means for the freezing compartment taking the form of a rectangular evaporator 18 which preferably defines that compartment, whereas the lower compartment 14 is cooled solely through the agency of a plate-like evaporator 19 supported, in any convenient manner, upon the rear wall of inner liner 11. As will be fully described hereinafter the lower, plate-like evaporator 19 is periodically defrosted by automatic means which includes the heat exchange apparatus of the present invention, and to collect the moisture which drains therefrom during the defrosting operation there is provided a trough 20 and an associated drain receptacle 21.

As mentioned above and as shown in Figure 2, the two evaporator portions 18 and 19 are utilized in combination with a refrigerant circulating and control circuit which forms the particular subject matter of the co-pending disclosure and which serves to maintain both compartments of the refrigerator at stable, predetermined temperatures. As clearly appears in Figure 2, in addition to the mentioned evaporators 18 and 19, the system includes a compressor 22 and a condenser 23 connected in refrigerant flow relationship with the said two evaporators through suitable conduits including a restrictor 24 of the capillary tube type and a suction conduit 25. Liquid refrigerant derived from the condenser 23 flows through the capillary restrictor 24 and is delivered to a liquid and gas separator 26, passing through a suitable drier 27 just prior to entry into the separator.

The food compartment evaporator 19 is caused, cyclically, to "pull down" to a predetermined minimum temperature, for example 0° F., and thereafter to rise to a predetermined maximum, defrosting temperature slightly in excess of the freezing point of water, for example 36° F. This cyclic operation, under the control of the thermally responsive switch means provided, serves to maintain stable temperature conditions within the two compartments 13 and 14, as will be better understood from what follows. The operation of the circulating system will first be described under the condition in which both evaporators are in series circuit and both are fed with liquid refrigerant.

Under the above-mentioned condition, liquid refrigerant accumulates in the separator 26 and passes to the evaporator 19 through the inlet tube or passage 28 which includes a short auxiliary restrictor 29. Liquid so delivered passes through the convolutions 30 secured to the plate of evaporator 19 causing refrigeration therein, and thereafter flows into the upper freezing evaporator 18 through the plate outlet passage or tube 31 and a short connection 32. The latter connection leads to the convolutions 33 provided upon the upper surface of freezer evaporator 18. The evaporator 18 is of known type in which refrigerant supplied to the convolutions 33 flows into parallel passages 34 (through tubing not shown) and the gaseous refrigerant which results from the normal refrigeration process in both evaporators is collected in a header 35, from which the gaseous refrigerant is returned to the compressor through the suction line 25.

During this phase of the operation of the apparatus, the switching devices presently to be described cause the upper evaporator 18 to cycle between predetermined upper and lower temperature limits, for example between +1° F. and —10° F., whereas the temperature of the lower evaporator 19 is reduced to the mentioned zero degree value.

In order to achieve the above-mentioned cyclic operation of the lower evaporator, and consequent stabilization of temperature within the lower compartment and automatic defrosting of the last-mentioned evaporator, the system is provided with a solenoid valve 36 of known type, which valve is disposed in a by-pass passage provided by a pair of conduits 37 and 38. Conduit 37 connects the valve with the lower portion of separator 26, and conduit 38 leads to the entry point 32 of the upper evaporator 18. A pair of temperature-responsive control devices 39 and 40 are provided, the device 39 being associated with a "feeler bulb" so disposed as to render the device 39 responsive to temperatures at the lower plate-like evaporator 19. The second switch device 40 is provided with a similar bulb and, in the embodiment illustrated, this latter bulb is directly associated with the tubing 33 disposed upon the upper surface of evaporator 18. Some variation in location of each of the mentioned bulbs is feasible.

As will be apparent from Figure 2, the compressor 22 is directly under control of the switch device 40 which, in response to a predetermined increase in the temperature of the freezer evaporator 18, places the compressor 22 across the line L. The other switch device 39, in response to the temperature condition prevailing at evaporator 19, is adapted to energize the solenoid valve 36 and thereby to move said valve to open position and to provide for flow through the by-pass passages 37 and 38. Since the valve 36 can be energized through switch device 39 only when the contacts of switch device 40 are closed, it will be apparent that control of refrigeration at the evaporator 19 is exercised when the compressor 22 is in operation, since the latter element is under the control of switch device 40. The solenoid valve 36 is of the normally closed type, and for this reason and as stated above closing of the contacts of switch device 39, in response to attainment of the predetermined minimum temperature at evaporator plate 19, results in opening of said valve 36.

Now considering the operation which results when the valve is opened, it will be seen that the liquid refrigerant within the separator 26 flows directly to the evaporator 18 through the by-pass conduit, since the auxiliary restrictor 29 causes the circuit through evaporator 19 to present appreciably more restriction to the flow of liquid refrigerant than is presented by the alternative circuit through upper evaporator 18. Thus, when the valve is opened, liquid refrigerant by-passes the evaporator 19 completely, the auxiliary restrictor 29 permitting only a very small quantity of refrigerant in the gaseous phase to pass into the evaporator 19. As will be understood, termination of flow of liquid refrigerant through the plate 19 enables heat which flows from the lower compartment 14 to the evaporator 19 to melt the frost which has accumulated upon the plate during the preceding period when the plate was supplied with liquid refrigerant, thereby also providing for continuance of the refrigerating process within the lower compartment 14.

It is highly advantageous that there be no interference with the freedom of plate 19 to rise toward its predetermined maximum temperature value, under the influence of heat available within the lower compartment 14, and as above indicated it is with this feature of the apparatus that the present invention is especially concerned.

In particular accordance with the present invention, and as was briefly set forth above, provision is made for adding heat to the plate inlet and outlet tubes 28 and 31 in order to facilitate termination of refrigeration at the plate and to expedite the temperature rise thereof. Preferably, and as illustrated, the means for adding heat takes the form of apparatus in which the main capillary tube 24 is disposed, throughout a portion of its length shown at 24a, in heat exchange relation with both the inlet and the outlet tubes. It is to be understood, however, that in a refrigerator of the general type illustrated, disposition of the main capillary tube in heat exchange relation with either of said tubes will result in achievement of certain advantages of the invention.

During the time when the solenoid valve 36 is open, and liquid refrigerant is diverted from the evaporator 19, there would result, in the absence of the improvement provided by this invention, some refrigeration at the inflow portion of the evaporator 19 due to the refrigerating effect of gaseous refrigerant flowing from the upper portion of the separator 26 to the evaporator 19 through the inlet tube 28. This would, of course, result in retarding the desired increase in temperature at the plate-like evaporator 19. The addition of heat to the inlet tube operates to elevate said tube and the plate inlet area to a temperature above 32° F., and thereby obviates the above-mentioned deleterious cooling which is not desired during the mentioned portion of the cycle. Conveniently, the heat is applied by providing for the transfer of sufficient heat, from the relatively warm liquid in the main capillary tube 24 to the cold gas flowing in the inlet tube 28, to effect the necessary temperature increase. It is to be noted that the portion 24a of the main capillary tube, that is the heat exchange portion, should be spaced somewhat from the outlet end of that tube in order that the refrigerant flowing within the capillary tube may contain heat sufficient to produce the desired effect.

In addition to the foregoing heat exchange relationship, heat is applied—also through the agency of the portion 24a of the main capillary tubing—to the outlet tube 31 which leads from the evaporator 19 toward the evaporator 18. Due to the presence of this heat exchanger, the heat of liquid available in the refrigerant flowing in the main restrictor tubing is employed to oppose or "erase" the cooling effect which would otherwise occur as a result of conduction of heat from the outlet area of the evaporator 19 to the freezing evaporator 18.

Considered from another point of view, the exchange of heat between the main capillary restrictor and the plate inlet tube counteracts the refrigerating effect, which would otherwise occurs at the inflow region, by making it possible for the heat within the main capillary tubing to dissipate the refrigerating effect of the cold gas. Similarly, and with respect to the disposition of the main restrictor in heat exchange relation with the plate outlet tube 31, refrigeration by thermal conductivity along said outlet tube is prevented.

During portions of the cycle when evaporator 19 is fed with liquid refrigerant, the described heat exchange relationships have no deleterious effect and are not of practical importance.

From the foregoing description it will be understood that by the present invention there is effected a significant improvement in two-temperature, plural evaporator refrigerators of the kind to which the invention is applicable. Heretofore, in the operation of such refrigerators and when substantially complete by-passing of the first of two series-connected evaporators was desired, it has proven difficult to isolate the by-pass evaporator completely as respects both convective transfer of heat, through the medium of gas present in the system, and conductive transfer of heat along the tubing connections. As a consequence, the desired cyclic operation of the mentioned evaporator has been interfered with and the operation of the overall apparatus has been deleteriously effected. It will now be clear that the novel heat exchanger which comprises the improvement of this invention completely overcomes the aforesaid difficulties and thereby makes a very substantial contribution to the effectiveness of such systems.

I claim:

1. In a refrigerating system of the type having elements including refrigerant circulating means, a restrictor of the capillary tube type and first and second evaporator portions, conduit means interconnecting said elements and including a passage providing for inlet of refrigerant from said restrictor to one of said evaporator portions and a passage provided for outlet of refrigerant from said one evaporator portion and flow thereof to said other evaporator portion, means including a liquid and gas separator and effective, under a modified condition of operation, to cause liquid refrigerant flowing through said capillary tube to by-pass said one evaporator portion and to flow directly to said other evaporator portion, said last-mentioned means being of such a character as to permit flow of a relatively small quantity of gaseous refrigerant through said inlet passage and into said one evaporator portion under said modified condition of operation, and means preventing undesired cooling of said one evaporator portion under said modified condition of operation, said means being effective to supply heat to said inlet passage at least under said modified condition of operation.

2. In a refrigerating system of the type having elements including refrigerant circulating means, a restrictor of the capillary tube type and first and second evaporator portions, conduit means interconnecting said elements and including a passage providing for inlet of refrigerant from said restrictor to one of said evaporator portions and a passage provided for outlet of refrigerant from said one evaporator portion and flow thereof to said other evaporator portion, flow control means including a liquid and gas separator and effective, under a modified condition of operation, to cause liquid refrigerant flowing through said capillary tube to by-pass said one evaporator portion and to flow directly to said other evaporator portion, said last-mentioned means being of such a character as to permit flow of a relatively small quantity of gaseous refrigerant through said inlet passage and into said one evaporator portion under said modified condition of operation, and means preventing undesired cooling of said one evaporator portion under said modified condition of operation, said means comprising disposition of a portion of said capillary tube restrictor in heat exchange relation with both said inlet and said outlet passages.

3. A system in accordance with claim 2, and further characterized in that said flow control means comprises a valve-controlled conduit connected with said separator and adapted to by-pass said one evaporator portion under said modified condition of operation.

4. In a refrigerating system of the type having elements including refrigerant circulating means, a restrictor of the capillary tube type, and first and second evaporator portions, conduit means interconnecting said elements and including an inlet passage interconnecting said restrictor and said first evaporator portion and an outlet passage connecting said first evaporator portion with said second evaporator portion, the construction and arrangement being such that flow of refrigerant within the system is normally from said restrictor through said first and second evaporator portions in series and thence back to said circulating means, means including a by-pass passage and a liquid and gas separator effective to cause liquid refrigerant to by-pass said first evaporator portion and to flow directly to said second evaporator portion under a modified condition of operation, said last-mentioned means being of such a character as to permit flow of a relatively small quantity of gaseous refrigerant through said inlet passage and to said first evaporator portion under said modified condition of operation, and means preventing undesired cooling of said first evaporator portion under the said modified condition of operation, said last means comprising apparatus for exchanging heat from said restrictor to said inlet passage.

5. A system in accordance with claim 4, and further characterized in that said last means comprises apparatus for exchanging heat from said restrictor to both said inlet and said outlet passage.

References Cited in the file of this patent

UNITED STATES PATENTS

| 2,520,045 | McGrath | Aug. 22, 1950 |
| 2,576,663 | Atchison | Nov. 27, 1951 |
| 2,601,549 | Morton | June 24, 1952 |